(No Model.)
M. E. THOMAS.
HUB.
No. 441,715. Patented Dec. 2, 1890.
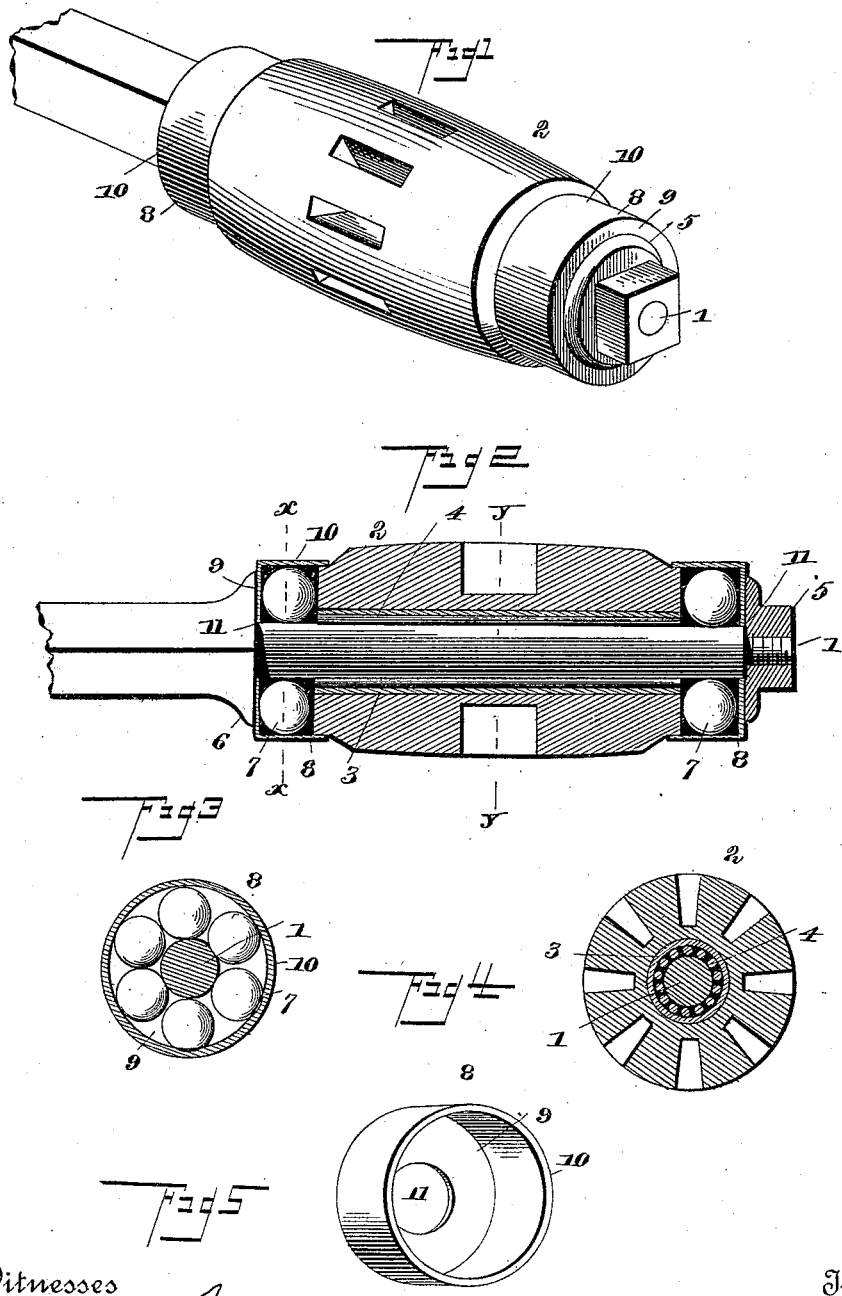
Witnesses
John Smisie
H. J. Riley
Inventor
Martin E. Thomas
By his Attorneys
C. A. Snow & Co.

UNITED STATES PATENT OFFICE.

MARTIN E. THOMAS, OF BATESVILLE, ARKANSAS, ASSIGNOR OF ONE-HALF TO JAMES H. McHUGH, OF OMAHA, NEBRASKA.

HUB.

SPECIFICATION forming part of Letters Patent No. 441,715, dated December 2, 1890.

Application filed February 15, 1890. Serial No. 340,611. (No model.)

*To all whom it may concern:*

Be it known that I, MARTIN E. THOMAS, a citizen of the United States, residing at Batesville, in the county of Independence and State of Arkansas, have invented a new and useful Hub, of which the following is a specification.

The invention relates to improvements in hubs.

The object of the present invention is to provide a hub of simple and comparatively inexpensive construction adapted to be readily attached to an axle of the ordinary construction and capable of turning on the spindle of said axle with practically no wear upon the axle-box, the nut, or the spindle of the axle.

The invention consists in the construction and novel combination and arrangement of parts hereinafter fully described, illustrated in the accompanying drawings, and pointed out in the claim hereto appended.

Referring to the drawings, Figure 1 is a perspective view of a hub constructed in accordance with the invention. Fig. 2 is a longitudinal sectional view. Fig. 3 is a transverse section on line $x$ $x$ of Fig. 2. Fig. 4 is a similar view on line $y$ $y$ of Fig. 2. Fig. 5 is a detail view of one of the caps.

In the drawings, 1 designates the spindle of an axle, and 2 the hub, which is provided with an axle-box 3 of the ordinary construction. The axle-box 3 is slightly larger than the spindle 1, and is provided with a series of rollers 4, that are interposed between it and the spindle and entirely surround the latter and prevent wear of the parts, as will readily be understood.

In order to prevent wear of the axle-nut 5 and the flange 6 at the inner end of the spindle, anti-friction balls 7 are provided and interposed between the hub and the flange 6 and the nut 5 and the hub. The anti-friction balls 7 are retained in operative position by similar caps or collars 8, that are composed of a disk 9 and an annular flange 10, formed integral with the disk and extending laterally from the periphery thereof. The disks 8 are provided with a central opening 11 to receive the spindle, and are arranged adjacent to the ends of the hub, with their disks contiguous to the nut and the flange 6 and their openings facing the ends of the hub. The balls 7 are arranged within the caps or collars around the spindle and engage the ends of the hub and prevent wear of the parts during the rotation of the wheel.

It will readily be seen that the hub is simple and comparatively inexpensive in construction and is adapted to be applied to the wheel and axle in common use.

Having thus described my invention, I claim—

The combination, with the spindle, of the hub provided with an enlarged axle-box, the anti-friction rollers arranged within the axle-box and entirely surrounding the spindle, the end bands or collars fitted on the hub and moving therewith and forming a part thereof and projecting beyond the same and forming collars, the anti-friction balls arranged within the end bands and bearing against the ends of the hub, and the nut, substantially as described.

In testimony that I claim the foregoing as my own I have hereto affixed my signature in presence of two witnesses.

MARTIN E. THOMAS.

Witnesses:
   L. M. SAMMONS,
   JAS. J. SOUTHARD.